US010634772B2

(12) United States Patent
Eckstein et al.

(10) Patent No.: US 10,634,772 B2
(45) Date of Patent: Apr. 28, 2020

(54) FLASH LIDAR WITH ADAPTIVE ILLUMINATION

(71) Applicant: Atieva, Inc., Menlo Park, CA (US)

(72) Inventors: Wiebke Eckstein, Redwood City, CA (US); Hans-Christoph Eckstein, Redwood City, CA (US); Eric Magnus Bach, Newark, CA (US)

(73) Assignee: ATIEVA, INC., Newark, CA (US)

( * ) Notice: Subject to any disclaimer, the term of this patent is extended or adjusted under 35 U.S.C. 154(b) by 360 days.

(21) Appl. No.: 15/822,287

(22) Filed: Nov. 27, 2017

(65) Prior Publication Data

US 2019/0162823 A1    May 30, 2019

(51) Int. Cl.

| | |
|---|---|
| G01S 7/00 | (2006.01) |
| G01S 7/484 | (2006.01) |
| G01C 21/36 | (2006.01) |
| G01C 21/28 | (2006.01) |
| G01S 17/10 | (2020.01) |
| G05D 1/02 | (2020.01) |
| G01S 17/89 | (2020.01) |
| G01S 7/481 | (2006.01) |
| G01S 13/86 | (2006.01) |
| G01S 17/42 | (2006.01) |

(Continued)

(52) U.S. Cl.
CPC ............. *G01S 7/484* (2013.01); *G01C 21/28* (2013.01); *G01C 21/3602* (2013.01); *G01C 21/3691* (2013.01); *G01S 7/4814* (2013.01); *G01S 7/4817* (2013.01); *G01S 13/865* (2013.01); *G01S 17/04* (2020.01); *G01S 17/10* (2013.01); *G01S 17/42* (2013.01); *G01S 17/86* (2020.01); *G01S 17/89* (2013.01); *G01S 17/931* (2020.01); *G05D 1/0231* (2013.01); *G01S 19/42* (2013.01); *G05D 1/0278* (2013.01)

(58) Field of Classification Search
CPC ........................................................ G01S 7/00
See application file for complete search history.

(56) References Cited

U.S. PATENT DOCUMENTS

| | | |
|---|---|---|
| 7,969,558 B2 | 6/2011 | Hall |
| 8,072,581 B1 | 12/2011 | Breiholz |
| | (Continued) | |

FOREIGN PATENT DOCUMENTS

WO    WO2012139796    10/2012

OTHER PUBLICATIONS

M. Sieler et al., Microoptical Array Projectors for Free-Form Screen Applications, Optics Express, vol. 21, No. 23, Nov. 18, 2013.
(Continued)

*Primary Examiner* — Truc M Do
(74) *Attorney, Agent, or Firm* — Patent Law Office of David G. Beck

(57) ABSTRACT

A light detection and ranging (lidar) system is provided that is incorporated into a vehicle and which is configured to efficiently adapt to varying road conditions as well as potential obstacles that may lie in the vehicle's pathway. The system employs a spatial light modulator (SLM) to create a plurality of illumination zones within the system's field of view. The SLM allows the lidar system to alter the size of each illumination zone as well as the light intensity within each of the zones as required by road conditions and potential obstacles.

23 Claims, 4 Drawing Sheets

(51) Int. Cl.
*G01S 17/04* (2020.01)
*G01S 17/86* (2020.01)
*G01S 17/931* (2020.01)
*G01S 19/42* (2010.01)

(56) References Cited

U.S. PATENT DOCUMENTS

| | | | |
|---|---|---|---|
| 8,767,190 B2 | 7/2014 | Hall | |
| 9,523,772 B2 | 12/2016 | Rogan et al. | |
| 9,575,164 B2 | 2/2017 | Kim | |
| 9,804,264 B2* | 10/2017 | Villeneuve | G01S 7/4815 |
| 10,393,877 B2* | 8/2019 | Hall | G01C 3/08 |
| 2005/0134440 A1 | 6/2005 | Breed | |
| 2007/0195270 A1* | 8/2007 | Hull | F21S 8/003 |
| | | | 352/49 |
| 2008/0033645 A1* | 2/2008 | Levinson | G01C 15/00 |
| | | | 701/469 |
| 2008/0068852 A1* | 3/2008 | Goihl | F21V 5/002 |
| | | | 362/509 |
| 2008/0198372 A1* | 8/2008 | Pan | B60Q 1/38 |
| | | | 356/121 |
| 2015/0009695 A1* | 1/2015 | Christmas | F21S 41/14 |
| | | | 362/466 |
| 2015/0346491 A1* | 12/2015 | Christmas | G03H 1/0808 |
| | | | 359/9 |
| 2016/0245902 A1* | 8/2016 | Watnik | G01S 7/4815 |
| 2017/0115387 A1 | 4/2017 | Luders et al. | |
| 2017/0328989 A1* | 11/2017 | Bartlett | G01S 7/4817 |
| 2017/0357000 A1* | 12/2017 | Bartlett | G01S 7/4816 |
| 2018/0113200 A1* | 4/2018 | Steinberg | G01S 7/4815 |
| 2018/0267148 A1 | 9/2018 | Buettner et al. | |

OTHER PUBLICATIONS

B. Boser et al., FMCW Ladar 3D Camera, http://swarmlab.eecs.berkeley.edu/projects/4884/fmcw-ladar-3d-camera.

S. Acharya et al., System Design of Time-of-Flight Range Camera for Car Park Assist and Backup Application, https://pdfs.semanticscholar.org/ec8f/5e5993560f7c2f0d2ba103bb917a76d778d4.pdf.

\* cited by examiner

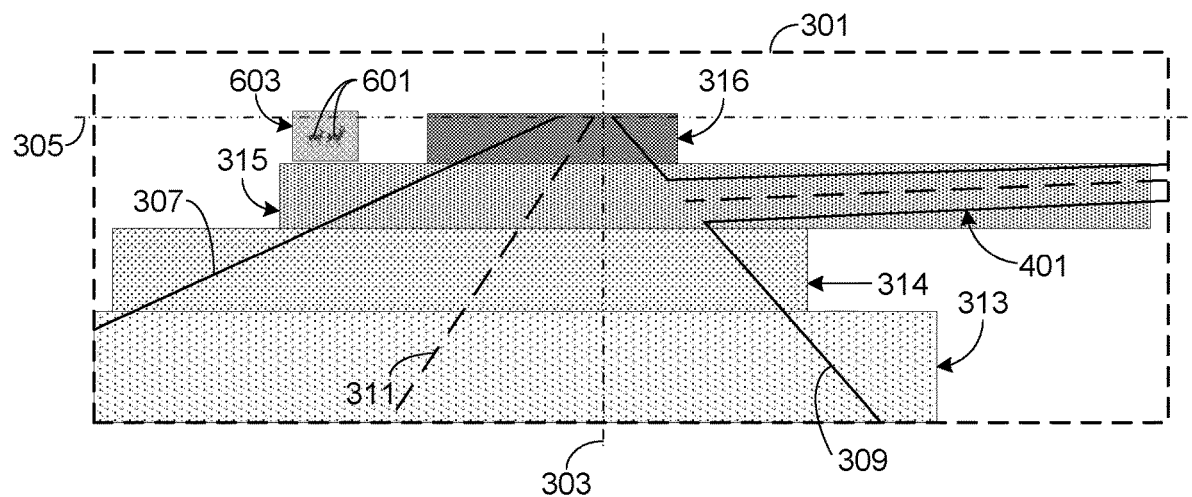
FIG. 6
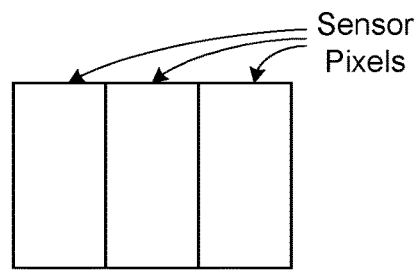
FIG. 7(a)
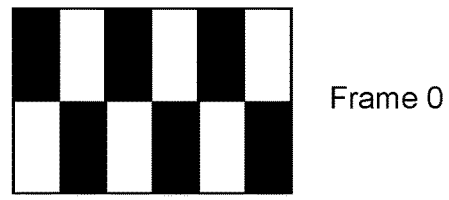
FIG. 7(b)   Frame 0
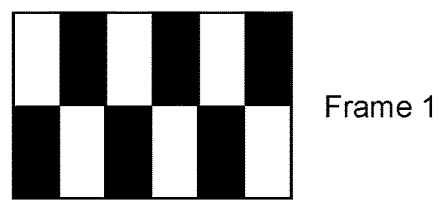
FIG. 7(c)   Frame 1
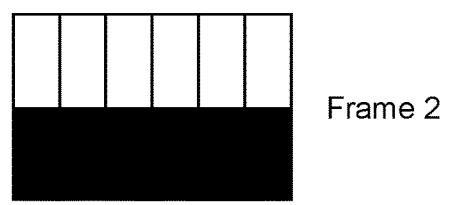
FIG. 7(d)   Frame 2

FLASH LIDAR WITH ADAPTIVE ILLUMINATION

FIELD OF THE INVENTION

The present invention relates generally to a lidar system and, more particularly, to a flash lidar system well suited for use in an autonomous or semi-autonomous vehicle control system.

BACKGROUND OF THE INVENTION

During the last several decades, car designers and manufacturers have implemented a variety of systems designed to enhance both the safety and convenience offered by their vehicles. Some of these systems that have become common on modern cars, such as anti-lock braking (e.g., ABS) and electronic stability control (e.g., ESC), improve driving safety by improving braking performance and reducing traction loss. Other vehicle systems, such as cruise control and the automated parallel parking systems offered as luxury options on a variety of cars, are designed to simplify the driving experience. More recently, vehicle engineering teams have been working on the development of fully autonomous vehicles, such vehicles being generally viewed as the next natural step in the progression of smart cars. Although initially the use of autonomous vehicles may be limited to industrial transport systems and simple automated people movers, as their use becomes accepted, autonomous vehicles are expected to (i) reduce traffic accidents and injuries, (ii) improve the mobility of the elderly as well as those people that are incapable of driving, (iii) provide drivers with more free time, (iv) decrease commuting time, and (v) free up more parking space.

Although all smart cars rely on sensor systems to monitor relevant vehicle and environmental conditions, fully autonomous vehicles require extremely sophisticated sensor systems in order to insure the safety of both the vehicle's passengers and anyone else that may be in proximity to the vehicle. Such sensor systems typically monitor vehicle performance (e.g., speed, turning radius, etc.), ambient conditions (e.g., light level, external temperature, weather conditions, etc.) and the car's proximity to both inanimate and animate objects (e.g., pedestrians, other vehicles, buildings, trees, signs, etc.). Given the importance of detection speed and accuracy, autonomous vehicles often rely on multiple sensor systems operating in unison, these sensor systems utilizing various detection schemes (e.g., camera-based, radar, lidar, etc.). While lidar systems have proven to provide rapid and accurate obstacle detection, their usefulness to date has been limited by packaging constraints, power requirements, and eye safety. Accordingly, what is needed is an energy efficient lidar system that operates at a low enough intensity to be eye safe while still providing an adaptive long range solution with packaging flexibility. The present invention provides such a lidar system.

SUMMARY OF THE INVENTION

The present invention provides an energy efficient, adaptive flash lidar (light detection and ranging) system with a small visible output aperture and a wide field of view (FoV) that is designed to be incorporated within a vehicle. The lidar system is comprised of a transmitter, a receiver, and a processing system. The transmitter includes a periodically modulated light source, i.e., a light source that is pulsed or has a time-dependent modulation. Preferably the light source is a laser with an operating wavelength within the range of 815 nanometers to 2 microns. The transmitter also includes a spatial light modulator (SLM) which, within the transmitter's FoV and during a single pulse of the light source, generates a plurality of illumination zones of differing light intensities. The lidar receiver includes a sensor array that captures light from the lidar transmitter that has been reflected by objects within the receiver's FoV. Preferably the FoV of the sensor array has an aspect ratio in the range of 3:1 to 10:1. The lidar processing system controls the SLM in order to achieve a predetermined zone size and predetermined light intensity for each illumination zone generated by the SLM. The lidar processing system is also tasked with performing time of flight (ToF) measurements on data acquired by the sensor array.

In one aspect, the SLM may be comprised of an active matrix backplane located on a first side of a liquid crystal layer and a transparent electrode located on the second side of the liquid crystal layer, where the active matrix backplane is comprised of a two-dimensional array of pixels with each pixel preferably being on the order of 10 microns or less in size. The pixels comprising the backplane are individually addressable by the lidar processing system and used to achieve the predetermined zone size and light intensity for each of the illumination zones. The SLM preferably includes a dielectric mirror configured to achieve high reflectivity at the operating wavelength of the lidar system's light source. The SLM's device stack is preferably sandwiched between a silicon substrate and a glass substrate.

In another aspect, the lidar processing system may be configured to generate a computer generated hologram (CGH). The phase only CGH, comprising a spatial arrangement of phase levels between 0 and at least 2 PI, may be pre-computed or computed in real time using an iterative Fourier transform algorithm (IFTA), such as a Gerchberg-Saxton algorithm. The CGH phase distribution is applied to the SLM using an active matrix backplane, thereby modifying the wave front of the incident laser beam(s) in order to generate the desired size and light intensity (e.g., light intensity per solid angle) for each of the illumination zones within the transmitter's FoV. Thus the system is able to utilize the SLM and the generated illumination zones to adapt the distribution of transmitted light within the transmitter's FoV to where it is needed, where need may be based on range (e.g., short range illumination versus long range illumination), detected obstacles (e.g., pedestrians, signs, other vehicles, etc.), road conditions (e.g., vehicle speed, straight versus curved road, city versus highway driving, etc.), or other conditions.

In one approach, the lidar processing system may be configured to apply a gradient of light intensities to the plurality of illumination zones where the lowest light intensity is assigned to the illumination zone nearest the vehicle, and the highest light intensity is assigned to the illumination zone closest to the FoV horizon while adapting the total angular range. In general, the intensity per solid angle increases with distance while the angular range decreases with distance. In another approach, the lidar processing system may be configured to receive the vehicle's current location from an on-board GPS system and a set of upcoming road conditions from a data base (e.g., an on-board navigation system's data base or an external data base), and then to generate the CGH in response to the vehicle's current location and the upcoming road conditions. In yet another approach, the lidar processing system may be configured to receive a set of upcoming road conditions from a secondary obstacle detection system (e.g., a sensor system using radar-based sensors, cameras, electromagnetic sensors, ultrasonic sensors, etc.), and then to generate the CGH in response to the upcoming road conditions.

In another aspect, the lidar system may include a first set of optics interposed between the light source and the SLM, where the first set of optics conditions the output light beam (e.g., expands and collimates the light beam) prior to it impinging on the SLM. The lidar system may further include a second set of optics that expands the output light beam reflected by the SLM in order to illuminate the lidar transmitter's intended FoV. The lidar system may further include a third set of optics that images the light reflected by objects within the receiver's FoV onto the sensor array.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 6 illustrates the FoV of an embodiment that utilizes secondary sensor systems to help adapt the lidar illumination zones to objects (e.g., signs, vegetation, pedestrians, wild life, etc.) within the lidar system's FoV;

FIG. 7(a) illustrates three sensor pixels of the lidar system's detector array;

FIG. 7(b) illustrates the first of three sequential illumination frames corresponding to the three sensor pixels shown in FIG. 7(a);

FIG. 7(c) illustrates the second of three sequential illumination frames corresponding to the three sensor pixels shown in FIG. 7(a); and FIG. 7(d) illustrates the third of three sequential illumination frames corresponding to the three sensor pixels shown in FIG. 7(a).

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
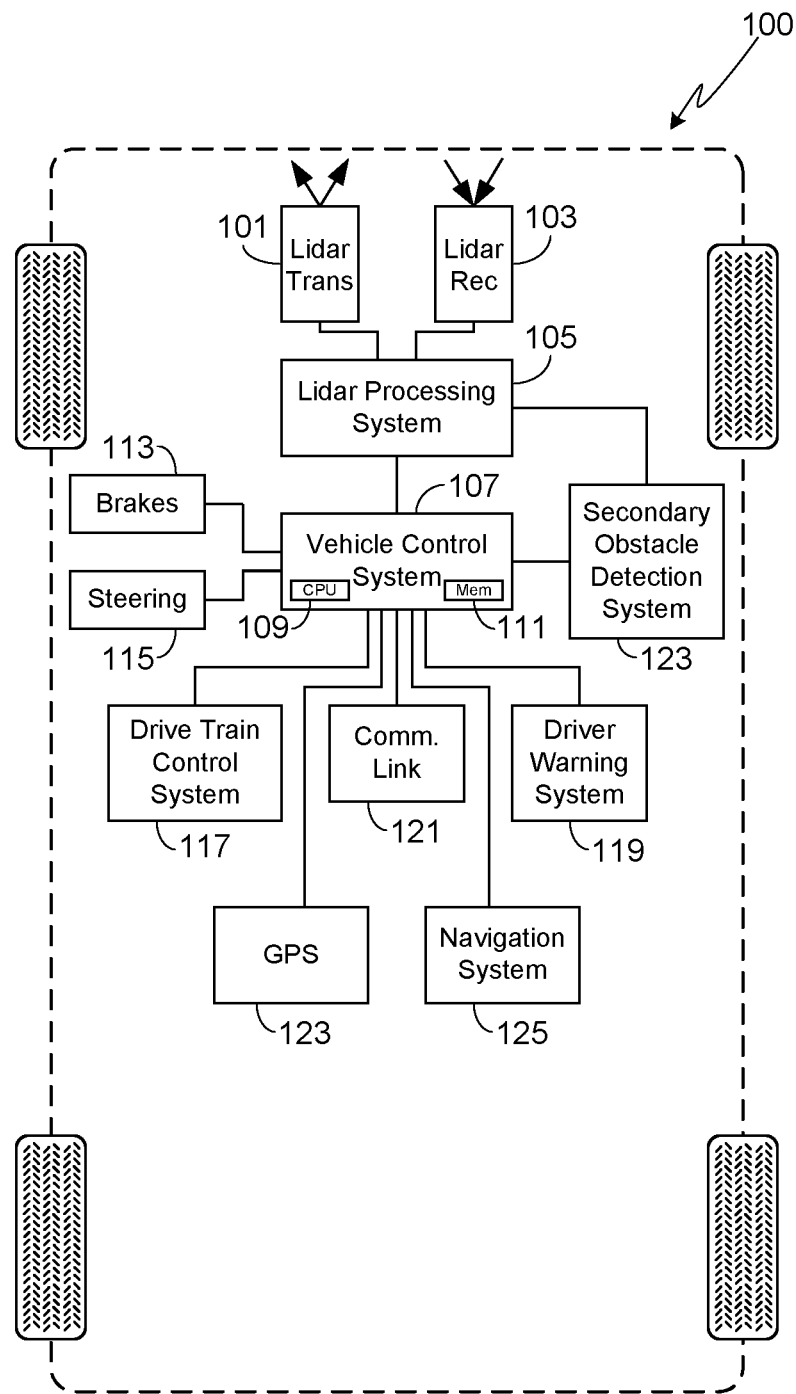
FIG. 1 provides a system level diagram of the primary vehicle systems utilized in at least one embodiment of the invention.

FIG. 1 provides a block diagram of an exemplary lidar (light detection and ranging) system integrated into a vehicle 100, where the lidar system includes a transmitter 101, a receiver 103, and a processing system 105. The lidar transmitter 101 and receiver 103 may be contained in separate modules, or co-located within a single module. Vehicle 100 may be an electric vehicle (EV), a vehicle utilizing an internal combustion engine (ICE), or a hybrid vehicle, where a hybrid vehicle utilizes multiple sources of propulsion including an electric drive system. It should be understood that the lidar system of the invention may be comprised of a single set or multiple sets of transmitters 101 and receivers 103, and that these transmitters/receivers may be integrated into external light modules (e.g., headlight assemblies), the vehicle's grill(s) or bumper(s), or any other convenient location. If multiple transmitter/receiver sets are utilized, each set may employ a dedicated processing system 105, or the same processing system 105 may support multiple transmitter/receiver sets.

Vehicle 100 includes a system controller 107 comprised of a central processing unit (CPU) 109 and memory 111, with memory 111 being comprised of EPROM, EEPROM, flash memory, RAM, solid state drive, hard disk drive, or any other type of memory or combination of memory types. Preferably system controller 107 is integral to the vehicle management system. Lidar processing system 105 may utilize a separate and independent processor, or it may utilize processor 109 of the vehicle control system 107.

The lidar system of the invention is intended to detect objects that are near vehicle 100 as well as obstacles that are potentially within the car's pathway. In one application, the information provided by the lidar system is used to simplify parking maneuvers, for example alerting the driver of any of a variety of obstacles (e.g., other cars, trees, buildings, etc.) that may interfere with vehicle parking. The lidar system can also augment various smart car features, for example by automatically applying the brakes and/or automatically throttling down the engine (e.g., for an ICE-based vehicle) and/or automatically slowing motor speed (e.g., for an EV) when an obstacle (e.g., pedestrian, vehicle, building, etc.) is detected in the vehicle's pathway and the system determines that an imminent collision is likely to occur. In addition to aiding a smart car's semi-autonomous capabilities, the lidar system of the invention can also be used in a vehicle that provides full autonomous driving.

In order to allow the lidar system of the invention to augment the semi-autonomous or completely autonomous capabilities of vehicle 100, vehicle control system 107 is preferably coupled to the vehicle's brake system 113, and/or the vehicle's steering system 115, and/or the vehicle's drive train control system 117. It will be appreciated that the nature of the control system 117 depends on whether vehicle 100 is an EV, an ICE-based vehicle, or a hybrid. In at least one embodiment, vehicle control system 107 is also coupled to a driver warning system 119, thus allowing the driver to be warned when an obstacle in the vehicle's pathway is detected. Warning system 119 may include an audible warning system that emits an audible warning indicator over the vehicle's sound system (e.g., the vehicle's entertainment system) or through a dedicated sound system. Alternately, or in combination with an audible indicator, warning system 119 may utilize a visible warning indicator, for example an indicator located in the dashboard or instrument panel or an indicator presented on a display screen.

In some embodiments, for example in some embodiments that provide full autonomous driving capabilities, vehicle control system 107 is capable of communicating, via telecommunication link 121, to systems outside of vehicle 100. Telecommunication link 121, also referred to herein as simply a communication link, may utilize any of a variety of standards including, but not limited to, GSM, EDGE, UMTS, CDMA, DECT, WiFi, and WiMAX. Communication link 121 can be configured to allow vehicle 100's control system 107 to communicate with other vehicles, for example when a collision is imminent. In some embodiments, communication link 121 is configured to allow vehicle 100's control system 107 to communicate with other vehicles and/or third party systems in order to provide improved traffic control. Communication link 121 may also be used to obtain system and/or configuration updates or to obtain information from external data bases.

As is understood by those of skill in the art, a lidar system provides obstacle detection as well as range information by measuring the time of flight (ToF) of light that is emitted by the lidar transmitter (e.g., transmitter 101), reflected from an obstacle in the system's field of view (FoV), and then received by the lidar receiver (e.g., receiver 103). One type of lidar system, referred to as flash lidar, illuminates the scene of interest using a laser pulse. A beam expander optically spreads the emitted laser beam to a sufficient degree to cover the desired FoV. The advantage of this approach is that a single pulse is distributed within the whole illumination FoV, whereby the pixels of the lidar receiver's ToF sensor integrate over multiple pulses or modulations of the backscattered light for each frame and thus can provide range information for all objects within a scene, where the scene is defined by the FoV. The disadvantage of this approach is that for a large FoV, such as that which results from the illumination of the region in front of a car at a distance of 100 to 200 meters, a relatively high power laser is required, e.g., on the order to 100 to 350 Watts. Assuming continuous or semi-continuous use, such power levels create a significant draw on vehicle resources (e.g., the vehicle's battery). Additionally, at these power levels the system generates significant heat, thereby adding to the thermal load applied to the vehicle's thermal management system. Furthermore, high reflectivity objects as well as those objects located within the detector's near field can easily saturate the lidar receiver's detector. Lastly, high laser power levels raise eye safety issues for pedestrians that may be illuminated by the lidar system.

To overcome the issues noted above, most conventional vehicle-mounted flash lidar systems limit the systems FoV, and thus limiting the required laser power, by relying on the lidar system only for near field obstacle detection, for example only during parking. Alternately, a vehicle-mounted system can use a scanning approach to scan the laser beam across the desired scene. While this approach solves the high power concerns associated with the flash lidar approach when applied to a large FoV, the scanning approach has its own set of issues. For example, the system used to scan the laser beam is quite complex, resulting in higher manufacturing and implementation costs as well as lower reliability. Additionally, since the scanning approach sequentially illuminates the scene rather than simultaneously illuminating the entire scene, vehicle motion as well as motion of scanned objects results in image distortion and inaccuracies.

Figure 2:
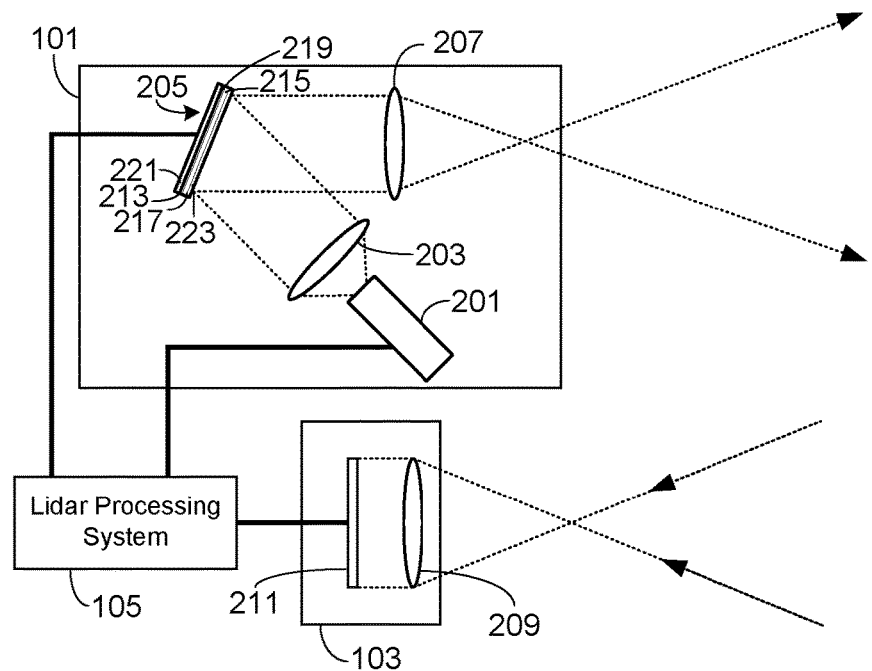
FIG. 2 provides an illustration of a preferred embodiment of the lidar system of the invention.

In order to overcome the drawbacks of both conventional flash and scanning lidar systems, the present invention utilizes an adaptive lidar system. A preferred embodiment of the lidar system of the invention is shown in FIG. 2. As illustrated, within the lidar transmitter 101 is a light source 201. Preferably light source 201 is a laser, and more preferably a laser operating within the wavelength range of 815 nanometers to 2 microns. Lidar processing system 105 modulates light source 201 at the desired operating frequency, preferably between 0.1 and 10 MHz. The modulation can be pulsed, periodic (e.g., sine, square, triangle modulation) or pseudo random. Optics 203 condition the output laser beam, typically by first expanding and then collimating the laser beam emitted by source 201. After conditioning, the laser beam impinges on spatial light modulator (SLM) 205. FIG. 2 shows a reflective SLM, as preferred, which applies a specific phase-only pattern to the wave front of the incoming beam. This leads to an efficient angular redistribution of the incoming light without the need of special absorption based bezels or apertures to tailor the shape of the light cone. Optics 207 expands the light reflected by SLM 205 in order to illuminate the desired FoV. Preferably the output aperture of transmitter 101 is quite small, for example on the order of 2 centimeters by 2 centimeters. The light that is reflected from objects within the FoV is imaged by optics 209 onto sensor array 211.

SLM 205 provides the necessary means for controlling the light intensity, in two dimensions, of the light emitted by source 201 in order to illuminate the desired FoV (e.g., the region in front of vehicle 100 that may include portions of the street, buildings, pedestrians, signs, vehicles, and other potential obstacles). Through the use of SLM 205, the light intensity emitted by lidar transmitter 101 can be varied based on the location and likely distance to each object within the system's FoV. If desired, the light intensity emitted by transmitter 101 can be varied based on the reflectivity of objects within the FoV. Utilizing the configuration shown in FIG. 2, the inventors have determined that light source 201 would only require a power of approximately 8 watts in order to illuminate the vehicle's FoV at 200 meters, assuming a detection height of approximately 2 meters. In contrast, a conventional flash lidar system illuminating the same FoV and detection height would require an approximately 280 watt laser source.

In the preferred embodiment, SLM 205 is a liquid crystal on silicon (LCOS) SLM. The SLM is divided into a two-dimensional array of pixels, with each pixel being electrically, and individually, addressable via an active matrix backplane 213 located on one side of the liquid crystal layer 215 and a transparent electrode 217 located on the other side of the liquid crystal layer. Backplane 213 is typically fabricated using CMOS technology (complementary metal-oxide-semiconductor), although other semiconductor backplane fabrication techniques may be used. Transparent electrode 217 may be comprised of a layer of an indium-tin-oxide (ITO) material. Preferably the pixel size corresponding to backplane 213, and thus SLM 205, is smaller than 10 microns in width in order to insure a sufficient FoV. Additionally, SLM 205 includes a layer 219 comprised of a dielectric mirror that is designed to achieve high reflectivity at the operating wavelength of source 201. The device stack is sandwiched between silicon substrate 221 and glass substrate 223. When a pixel is activated by applying an electric field across the liquid crystal in that pixel, the phase of light passing through that region of liquid crystal is altered. In order to achieve the desired light intensity distribution, processing system 105 generates a phase distribution, referred to as a computer generated hologram (CGH), which is then applied to SLM 205 using backplane 213. Given the efficiency of dielectric mirrors (i.e., layer 219), an advantage of creating the desired light intensity distribution using light interference is that this approach is extremely efficient.

As previously noted, in order to derive the distance between vehicle 100 and obstacles within the lidar system's FoV, ToF measurement are made based on the light received by sensor array 211 for each pulse of light originating from source 201. Sensor array 211 may be fabricated using any of a variety of semiconductor fabrication techniques commonly used to fabricate detector arrays, for example CMOS technology. Preferably sensor array 211 is at least 100 pixels wide and 10 pixels high. It will be appreciated that there is a trade-off between the number of pixels, and thus the resolution, of array 211 and the cost and complexity of the array. Additionally, higher pixel arrays increase data handling requirements, including data acquisition speeds. With respect to the aspect ratio of array 211, this ratio is based on the illuminated FoV. The inventors have found that preferably the aspect ratio for array 211 is in the range of 3:1 to 10:1. This aspect ratio can be achieved by using a sensor array having a ratio in this range or by using multiple sensors in the x-direction. For multiple sensors, single or multiple imaging by optics 209 may be used. The use of multiple imaging optics provides advantages both in terms of integration space and optical system simplicity.

Figure 3:
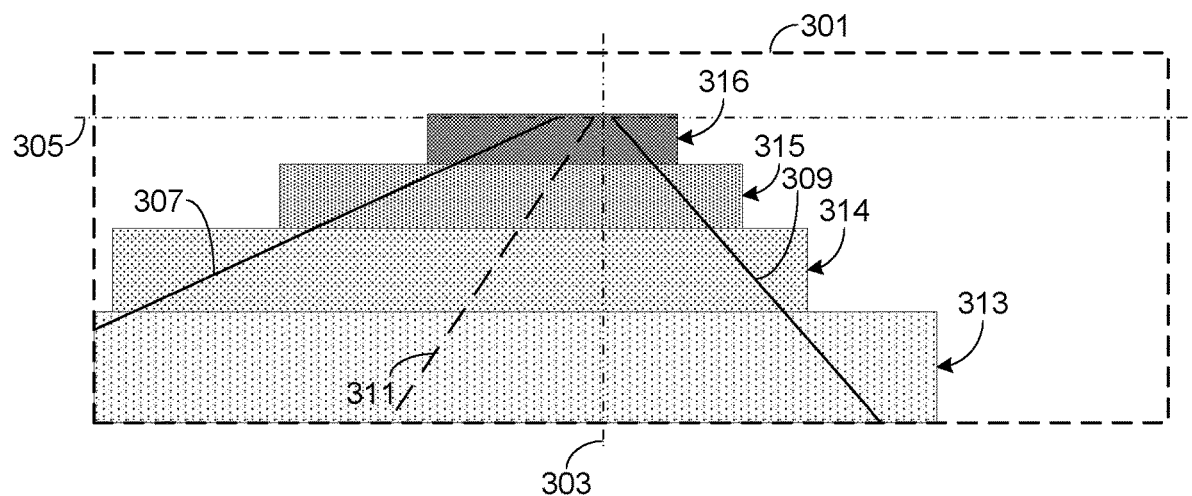
FIG. 3 illustrates the FoV for one embodiment of the lidar system of the invention.

In one of the simplest embodiments, SLM 205 can simultaneously address a plurality of illumination zones which are monitored within the receiver's FoV. FIG. 3 illustrates both the illumination zones as well as the sensor's FoV for this configuration. In this exemplary embodiment the lidar system is comprised of a single transmitter/receiver set. Rectangle 301 represents the lidar receiver sensor's FoV. Within the receiver sensor's FoV, the illumination zones are adapted to address the specific regions of interest (e.g., roadway and areas adjacent to the roadway) as well as the different distances to each of these regions (i.e., the distances between the lidar system and each region of interest). Tailoring the illumination zones allows the system to control zone size and light intensity (e.g., power per solid angle) to adapt to varying conditions.

To insure low power consumption regardless of the distance between the lidar system and the region to be illuminated, the intensity and angular range of the illumination for each illumination zone is adapted. For example in the embodiment illustrated in FIG. 3, illumination zones 313-316 correspond to distances of 0-10 meters, 10-30 meters, 30-100 meters, and 100-300 meters, respectively. In order to achieve an illumination with a constant power per square meter for different ranges, it is necessary to increase the power per solid angle for higher distances. Therefore a rough estimation considering 10 mW/m² needed for detection for the sensor and assuming a road width of 20 meters and a detection height of 2 meters yields:

FoV@5 m distance: 125°×23° (=0.7 sr) requires ~500 mW/sr,
FoV@50 m distance: 22°×2.3° requires ~25,000 mW/sr,
FoV@100 m distance: 11.5°×1.2° requires ~100,000 mW/sr,
FoV@200 m distance: 5.7°×0.6° requires ~400,000 mW/sr, To achieve a sufficient 200 meter range illumination for a conventional, non-adaptive lidar system's FoV of 125°×23°, approximately 280 W are necessary. This constant illuminated FoV leads to high power consumption as well as intensities that are too high for short distances. To solve this power issue and realize an almost constant power per square meter for different ranges, in the present system the intensity per solid angle increases with distance, but the total illuminated angular range decreases with distance. In the exemplary embodiment illustrated in FIG. 3, the present approach leads to significantly reduced power requirements for the lidar transmitter, i.e., down from the approximately 280 watts necessary in the conventional non-adaptive lidar system to about 8 watts using the present system. Note that in FIG. 3, line 303 represents 0 degrees azimuthal, and therefore splits the system's FoV between left and right sides. Line 305 represents 0 degrees altitude and the horizon. To aid in understanding the figure, a road is shown in FIG. 3, where the road includes left road boundary 307, right road boundary 309, and road centerline 311.

Figure 4:
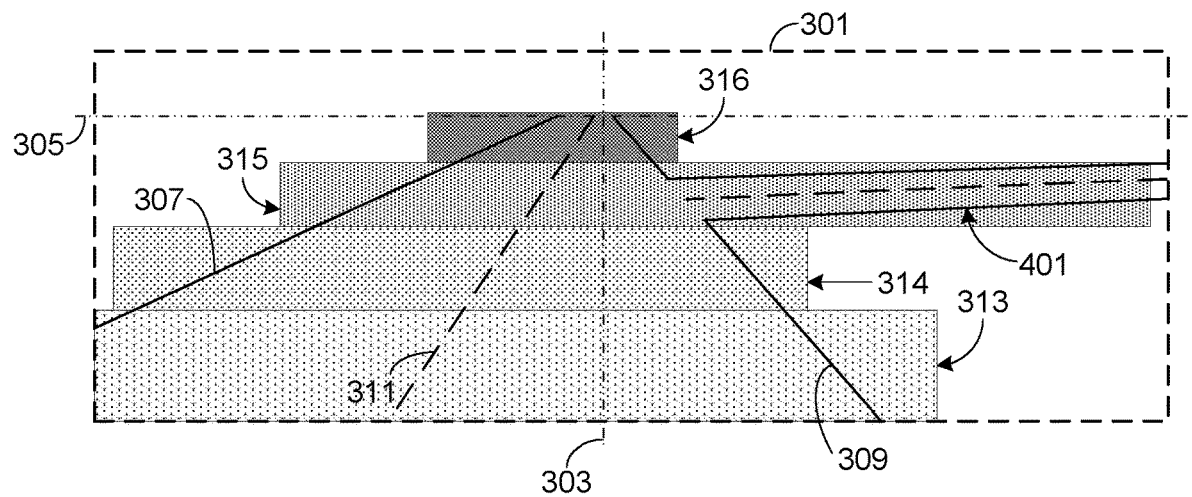
FIG. 4 illustrates the FoV for an alternate embodiment utilizing vehicle location data.
Figure 5:
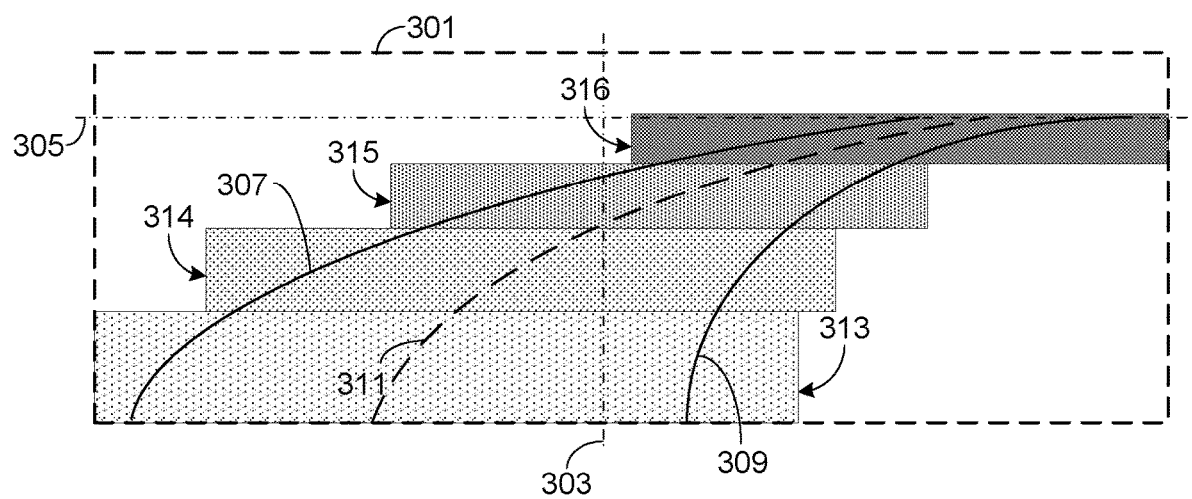
FIG. 5 provides a second exemplary FoV for the embodiment illustrated in FIG. 4.

In the embodiment shown in FIG. 3, SLM 205 simultaneously divides the transmitter's FoV into four illumination zones 313-316. It will be appreciated that the FoV can be divided into fewer illumination zones, albeit at least two zones, or more illumination zones than those shown. As noted above, dividing the FoV into multiple zones allows the lidar system of the invention to generate higher light intensities where needed while minimizing light source power. In the example shown in FIG. 3, the lowest light intensity is nearest the vehicle (zone 313), with increasing light intensity as the horizon (line 305) is approached. Accordingly, the highest light intensity is in zone 316 where the distance between the vehicle (e.g., vehicle 100) and potential obstacles is greatest (e.g., on the order of 100-300 meters). In general, in this embodiment the intensity per solid angle increases with distance while the angular range decreases with distance The example shown in FIG. 3 represents a simple embodiment of the invention in which the light intensity for each lidar illumination zone, which is controlled by SLM 205, varies based on an assumption of the distance of each zone from the vehicle's lidar system. Furthermore, this embodiment is primarily focused on the region directly in front of the car. FIGS. 4 and 5 illustrate another embodiment in which the light intensity distribution from the lidar system, as provided by SLM 205, is capable of taking into account varying road conditions. In this embodiment, lidar processing system 105 utilizes information provided by other vehicle systems in order to generate the CGH that is utilized by SLM 205 to achieve the desired light intensity distribution. Specifically, in this embodiment the vehicle's location on a map is used to determine upcoming road conditions. Preferably the location of vehicle 100 is provided by an on-board GPS system 123. Road conditions, such as upcoming intersections and road curves, are preferably provided by an on-board navigation system 125, although this same information may be contained in an on-board data base (e.g., a data base stored in memory 111) or obtained from an external data base using communication link 121. If desired, the lidar system can also take into account vehicle speed, a vehicle characteristic routinely monitored by the vehicle control system 107, and therefore accessible by the lidar processing system 105.

By monitoring approaching road conditions, lidar system 105 is able to continually update the CGH utilized by SLM 205 to insure that the light intensity distribution of the lidar system matches upcoming road conditions. For example and as illustrated in FIG. 4, if the system determines that a secondary road 401 will intersect the current road, then the illumination zones are varied as shown to insure that vehicles traveling on the secondary road are detected. Similarly, and as shown in FIG. 5, if the data (i.e., current vehicle location and map data) indicate that the current road curves to the right as illustrated, then the location and size of the illumination zones 313-316 are appropriately altered by the lidar system's SLM.

While the ability to continually update the lidar system to adapt to varying road conditions is a distinct advantage of the present invention, especially given the system's efficiency and low light source power requirements, in the preferred embodiment of the invention the system is also able to adapt to potential obstacles. In this embodiment in addition to adapting to road conditions, the system uses information provided by secondary obstacle detection systems 123 to update the CGH utilized by SLM 205, thus allowing the system to adapt to the ever-changing environment in which vehicle 100 travels. Secondary detection system 123 may utilize a radar-based sensor, a camera operating in the visible spectrum, a camera operating in the infrared spectrum, electromagnetic sensors, ultrasonic sensors, or other sensor types. Detection system(s) 123 may use a stereo-vision-based detection algorithm, a v-disparity algorithm, or other algorithm to determine the height and/or location of a detected obstacle.

By utilizing one or more secondary detection systems to detect objects that may be in or adjacent to the roadway, the lidar processor of the invention is capable of continually adapting the light intensity distribution, via the CGH used with SLM 205, to insure that these objects are monitored by the lidar system. Thus as illustrated in FIG. 6, a pair of deer 601 that are in the distance, and may at some point wander onto the road, are monitored by the lidar system. Specifically, the lidar system adapts the FoV such that zone 603, and thus the objects within that zone (i.e., deer 601), are monitored.

In addition to adapting to varying road conditions and potential obstacles, the present invention can utilize SLM 205 to provide enhanced resolution. In order to achieve enhanced resolution, SLM 205 is used to provide a light distribution that has a smaller pixel size than the sensor pixel size, at least in the zone in which increased resolution is desired. By pixelating the transmitted light into smaller pixel sizes than those used by the detector array, and by sequentially illuminating different pixels for each detector pixel, an overlay of the acquired sensor data increases the effective resolution of the detector array. FIG. 7 illustrates this approach. The image shown in FIG. 7(a) is that of three sensor pixels of detector array 211. FIGS. 7(b)-7(d) illustrate three sequential illumination frames corresponding to the three sensor pixels shown in FIG. 7(a) which, when overlaid, provide the desired increase in effective resolution. It will be understood that in this embodiment the sequence of illumination frames would simply be repeated throughout the time in which increased resolution is desired.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A flash light detection and ranging (lidar) system incorporated into a vehicle, comprising:
a lidar transmitter incorporated into said vehicle, said lidar transmitter comprising a periodically modulated light source and a spatial light modulator (SLM), said SLM further comprising an active matrix backplane located on a first side of a liquid crystal layer and a transparent electrode located on a second side of said liquid crystal layer, said active matrix backplane comprised of a two-dimensional array of pixels, said SLM further comprising a dielectric mirror providing high reflectivity at the operating wavelength of said periodically modulated light source, wherein an output light beam generated by said periodically modulated light source is reflected by said SLM prior to transmittance by said lidar transmitter, and wherein within a first field of view (FoV) corresponding to said lidar transmitter and within a single pulse of said periodically modulated light source said SLM generates a plurality of illumination zones of differing light intensity;
a lidar receiver incorporated into said vehicle, said lidar receiver further comprising a sensor array, wherein light reflected by objects within a second FoV corresponding to said lidar receiver is captured by said sensor array; and
a lidar processing system coupled to said lidar transmitter and to said lidar receiver, said lidar processing system configured to adapt said SLM to achieve a predetermined zone size and a predetermined light intensity for each illumination zone of said plurality of illumination zones generated by said SLM, wherein said lidar processing system generates a computer generated hologram (CGH) and applies said CGH to said SLM using said active matrix backplane, wherein application of said CGH to said SLM using said active matrix backplane generates said predetermined zone size and said predetermined light intensity for each illumination zone, wherein each pixel comprising said two-dimensional array of pixels of said SLM is individually addressable by said lidar processing system, and wherein said lidar processing system is configured to individually address each pixel of said two-dimensional array of pixels to achieve said predetermined zone size and said predetermined light intensity for each illumination zone generated by said SLM, wherein said plurality of illumination zones extend from a first horizontal illumination zone closest to said vehicle to a last horizontal illumination zone closest to a FoV horizon, wherein said lidar processing system increases said predetermined light intensity per illumination zone from said first horizontal illumination zone to said last horizontal illumination zone, and wherein said lidar processing system performs time of flight (ToF) measurements on data acquired by said sensor array.

2. The flash lidar system of claim 1, wherein an intensity per solid angle corresponding to each illumination zone of said plurality of illumination zones increases with distance, and wherein an angular range corresponding to each illumination zone of said plurality of illumination zones decreases with said distance.

3. The flash lidar system of claim 1, said lidar processing system configured to receive a current vehicle location from an on-board global positioning system (GPS) and to receive a set of upcoming road conditions from a data base, wherein said lidar processing system is configured to generate said CGH in response to said current vehicle location and said set of upcoming road conditions and to apply said CGH to said SLM using said active matrix backplane.

4. The flash lidar system of claim 3, wherein said data base is integral to an on-board navigation system.

5. The flash lidar system of claim 3, wherein said data base is an external data base.

6. The flash lidar system of claim 1, said lidar processing system configured to receive a set of upcoming road conditions from a secondary obstacle detection system, wherein said lidar processing system is configured to generate said CGH in response to said set of upcoming road conditions and to apply said CGH to said SLM using said active matrix backplane.

7. The flash lidar system of claim 6, said set of upcoming road conditions further comprising a plurality of locations corresponding to potential obstacles within said first FoV.

8. The flash lidar system of claim 6, said secondary obstacle detection system selected from the group consisting of radar-based sensors, cameras, electromagnetic sensors and ultrasonic sensors.

9. The flash lidar system of claim 1, said CGH comprising a spatial arrangement of phase levels between 0 and at least 2 PI.

10. The flash lidar system of claim 1, said CGH comprising a pre-computed spatial arrangement of phase levels.

11. The flash lidar system of claim 1, said CGH comprising a spatial arrangement of phase levels, wherein said lidar processing system computes said spatial arrangement of phase levels in real time by applying an iterative Fourier transform algorithm.

12. The flash lidar system of claim 1, said SLM further comprising a silicon substrate and a glass substrate, wherein said active matrix backplane, said liquid crystal layer, said transparent electrode, and said dielectric mirror are sandwiched between said silicon substrate and said glass substrate.

13. The flash lidar system of claim 1, wherein each pixel comprising said two-dimensional array of pixels is less than 10 microns in size.

14. The flash lidar system of claim 1, wherein said lidar processing system performs said ToF measurements on data acquired by said sensor array during multiple pulses of said periodically modulated light source.

15. The flash lidar system of claim 1, wherein an illumination pixel size corresponding to at least one illumination zone of said plurality of illumination zones is smaller than a sensor pixel size corresponding to said sensor array.

16. The flash lidar system of claim 1, wherein a width to height aspect ratio of said second FoV corresponding to said lidar receiver is in the range of 3:1 to 10:1.

17. The flash lidar system of claim 1, further comprising a first set of optics interposed between said periodically modulated light source and said SLM, wherein said first set of optics conditions said output light beam prior to said output light beam impinging on said SLM.

18. The flash lidar system of claim 17, wherein said first set of optics expands and collimates said output light beam.

19. The flash lidar system of claim 17, further comprising a second set of optics, wherein said second set of optics expands said output light beam reflected by said SLM in order to illuminate a first FoV corresponding to said lidar transmitter.

20. The flash lidar system of claim 17, further comprising a third set of optics, wherein said third set of optics images said light reflected by objects within said second FoV onto said sensor array.

21. The flash lidar system of claim 1, said periodically modulated light source comprising a laser with an operating wavelength within a wavelength range of 815 nanometers to 2 microns.

22. The flash lidar system of claim 1, wherein said lidar processing system modulates said periodically modulated light source at a frequency within a frequency range of 0.1 MHz to 10 MHz.

23. The flash lidar system of claim 1, wherein said lidar processing system utilizes a processor incorporated into a vehicle control system.

* * * * *